(12) United States Patent
Sivasubramaniam et al.

(10) Patent No.: US 7,183,678 B2
(45) Date of Patent: Feb. 27, 2007

(54) AC WINDING WITH INTEGRATED COOLING SYSTEM AND METHOD FOR MAKING THE SAME

(75) Inventors: Kiruba Sivasubramaniam, Clifton Park, NY (US); Evangelos Trifon Laskaris, Schenectady, NY (US); James Pelligrino Alexander, Ballston Lake, NY (US); Manoj Ramprasad Shah, Latham, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 10/766,459

(22) Filed: Jan. 27, 2004

(65) Prior Publication Data

US 2005/0162025 A1 Jul. 28, 2005

(51) Int. Cl.
*H02K 1/32* (2006.01)
(52) U.S. Cl. .......................... 310/64; 310/216
(58) Field of Classification Search ............ 310/52–59, 310/214–216, 254, 258–260, 64
See application file for complete search history.

(56) References Cited

U.S. PATENT DOCUMENTS

| | | | |
|---|---|---|---|
| 3,609,420 A | 9/1971 | Inagaki et al. | |
| 3,634,705 A | 1/1972 | Fidei et al. | |
| 3,648,085 A | 3/1972 | Fujii | |
| 4,517,479 A | 5/1985 | Aleem et al. | |
| 5,731,645 A * | 3/1998 | Clifton et al. | ................. 310/74 |
| 6,438,969 B1 | 8/2002 | Laskaris et al. | |
| 6,624,547 B1 * | 9/2003 | Emery | ........................ 310/254 |

\* cited by examiner

*Primary Examiner*—Thanh Lam
(74) *Attorney, Agent, or Firm*—Fletcher Yoder

(57) ABSTRACT

A winding of an electric machine is provided, where the winding includes at least one series of serially connected AC bars. Each AC bar includes a series of serially connected turns formed by litz wire having a plurality of strands, and at least one cooling tube. Individual strands of the plurality of strands are respectively positioned substantially adjacent to the at least one cooling tube at at least one transfer point for providing heat transfer from the respective individual strands to the at least one cooling tube.

20 Claims, 4 Drawing Sheets

AC WINDING WITH INTEGRATED COOLING SYSTEM AND METHOD FOR MAKING THE SAME

BACKGROUND OF THE INVENTION

The present disclosure relates to AC windings of electric machines, and particularly, to cooling systems integrated with AC windings of high frequency electrical machines, and further, to a method of manufacture for making the AC windings.

It is well known that the capacity and efficiency of electric machines, such as motors and generators, can be improved by providing appropriate cooling systems for dissipating heat generated during operation. A variety of cooling methods have evolved for minimizing the effects of generated heat.

Known cooling methods include application of a cooling medium, such as air or a fluid to the exterior or a portion thereof of an armature winding, such as within a closed or open chamber housing the armature winding, or through conduits, such as pressurized or non-pressurized conduits contacting the exterior of the armature winding. Such approaches are illustrated, for example, in U.S. Pat. No. 3,609,420 issued Sep. 28, 1971 to Inagaki et al.; U.S. Pat. No. 3,648,085 issued Mar. 7, 1972 to Fujii; U.S. Pat. No. 4,517,479 issued May 14, 1985 to Aleem et al.; and commonly owned U.S. Pat. No. 6,438,969 issued Aug. 27, 2002 to Laskaris et al.

Another approach to cooling the armature winding includes the method of providing the armature winding with hollow conductors through which a cooling medium flows for dissipation of heat. A representative patent describing the above method is U.S. Pat. No. 3,634,705 issued Jan. 11, 1972 to Fidei. Further, it is known to co-wind cooling tubes with armature winding turns.

The occurrence of AC losses in armature windings is also known to negatively affect capacity and efficiency of electric machines. In high frequency machines used for applications calling for high speed and/or high power density, such as machines operating at frequencies significantly higher than 60 Hz, the AC losses can dominate operation of the electric machine. Furthermore, the heat generation escalates such that known cooling techniques are not sufficient or practical. For example, the cooling method using hollow conductors becomes impractical, as the conductors in high frequency machines are typically numerous, thin, and not conducive to having an interior channel.

Accordingly, there is a need for an improved armature winding usable in high frequency electric machines for minimizing AC losses and for improving cooling techniques.

Furthermore, there is a need for a cost effective method of manufacture for the improved armature winding.

BRIEF DESCRIPTION OF THE INVENTION

A winding of an electric machine is provided. The winding includes at least one series of serially connected AC bars, each AC bar including a series of serially connected turns formed by litz wire having a plurality of strands, and at least one cooling tube. Individual strands of the plurality of strands are respectively positioned substantially adjacent to the at least one cooling tube at at least one transfer point for providing heat transfer from the respective individual strands to the at least one cooling tube.

In another embodiment of the present disclosure, an electric machine having an AC winding is provided having at least one series of serially connected AC bars. Each AC bar includes a series of serially connected turns formed by litz wire having a plurality of strands, and at least one cooling tube, wherein individual strands of the plurality of strands are respectively positioned substantially adjacent to the at least one cooling tube at at least one transfer point for providing heat transfer from the respective individual strands to the at least one cooling tube.

In still another embodiment of the present disclosure, a winding of an electric machine is provided. The winding includes at least one series of serially connected AC bars. Each AC bar includes a series of serially connected turns including at least one conductor; at least one cooling tube having a cooling medium flowing through a conduit having a thermally conductive surface; and a phase to ground insulation for providing electrical phase to ground insulation for the AC bar, wherein the phase to ground insulation surrounds the series of serially connected turns and the at least one cooling bar. Respective turns of the series of turns contact the at least one cooling tube for transferring heat from the respective turns to the at least one cooling tube, wherein at each point of contact the phase to ground insulation does not intervene between the conductive surface of the at least one cooling tube and a respective conductor of the at least one conductor.

In another embodiment of the present disclosure, a method of manufacturing an AC winding of an electric machine is provided. The method includes the steps of winding a litz wire into a coil having a series of turns at ambient temperature; insulating the coil with a thermally activated adhesive at ambient temperature; shaping the coil into a predetermined shape at ambient temperature; and heating the coil for curing the adhesive.

In a further embodiment of the present disclosure, a method of manufacturing an AC winding of an electric machine is provided. The method includes the steps of winding the litz wire into a coil having a series of turns; shaping the coil into a predetermined shape; and epoxy impregnating the coil.

BRIEF DESCRIPTION OF THE DRAWINGS

The above and other aspects, features, and advantages of the present invention will become more apparent in light of the following detailed description when taken in conjunction with the accompanying drawings in which.

DETAILED DESCRIPTION OF THE INVENTION

Figure 1:
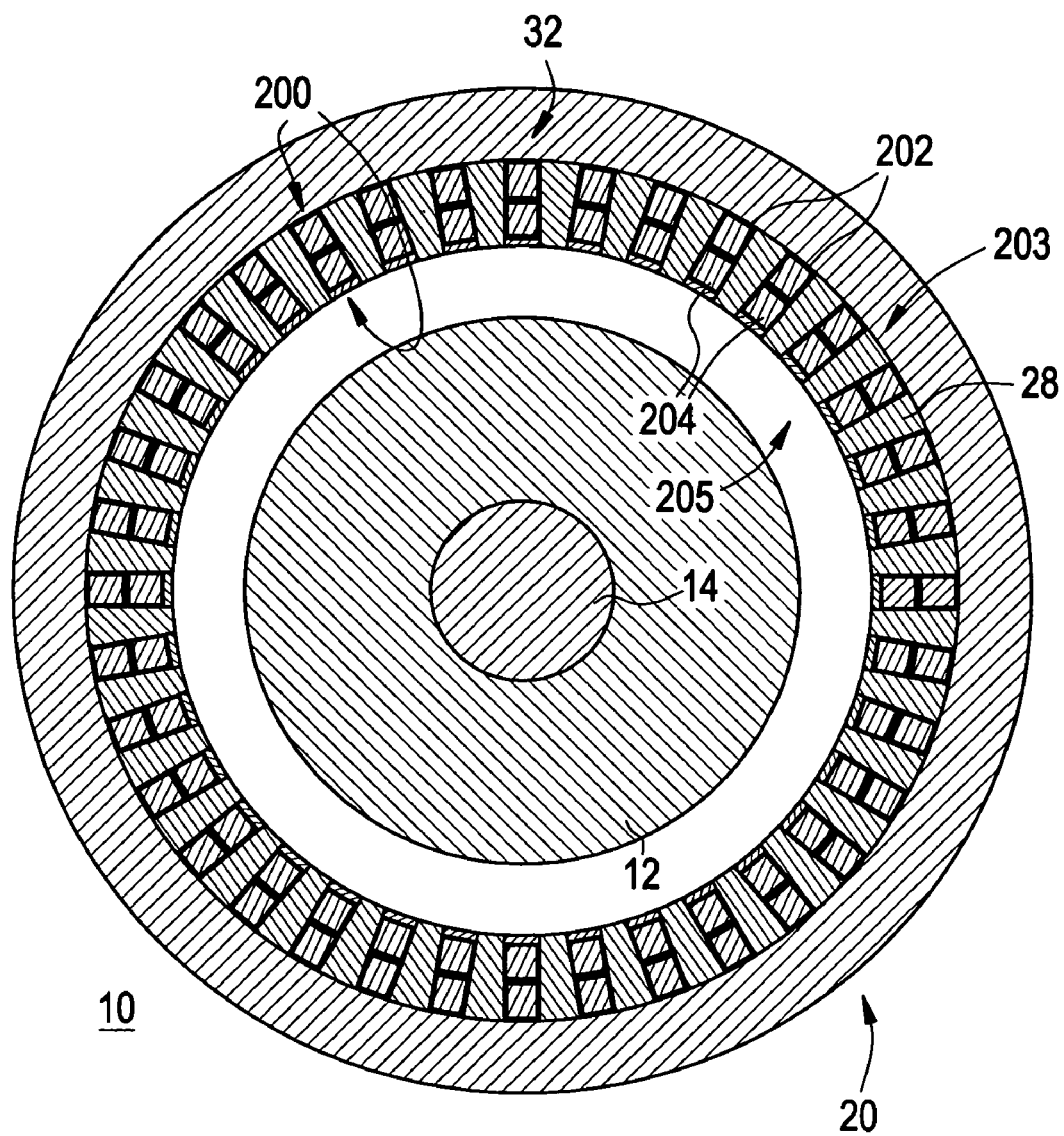
FIG. 1 is a cross-sectional view of a stator of an electric machine.

Embodiments of the present disclosure will be described herein below with reference to the accompanying drawings. In the following description, well-known functions or constructions are not described in detail to avoid obscuring the invention with unnecessary detail. Throughout the figures, like reference numerals represent like elements.

In high frequency electrical machines, a winding including at least one series of coils formed of multi-strand litz wire turns, and a cooling system for cooling the winding in which at least one cooling tube is provided for respective coils of the winding, with each turn of an individual coil transferring heat to the at least one cooling tube, where heat is transferred along respective individual strands of the multi-strand litz wire, and from the respective individual strands to the at least one cooling tube. The AC winding may be any winding of an electric machine through which power flows, for example, an armature winding or an AC field winding in a stator or a rotor.

FIG. 1 is a cutaway view of an exemplary machine 10 having a rotor 12, a stator 20 and an AC winding 32, here shown as a stator armature winding. A shaft 14 is shown which extends within a cavity defined by the stator and along the length of the electric machine (i.e. in a direction perpendicular to the paper), where the shaft 14 supports rotor 12. While the following discussion is directed to a stator armature winding, it is understood that the configuration of AC winding 32 may be employed for other windings through which AC power flows, including windings on a rotor.

A plurality of AC bars 200 of AC winding 32 are exposed and shown, including an outer annular array having a plurality of outer AC bars 202 positioned adjacent to the outer perimeter of a stator core 28 of the stator 20 forming an outer winding 203, and an inner annular array having a plurality of inner AC bars 204 positioned adjacent to the inner perimeter of the stator core 28 forming an inner winding 205. The plurality of AC bars 200 are shown in FIG. 1 as a plurality of armature bars, however the AC bars may be any equivalent structure in the electric machine, including in the rotor. Further, AC windings 32 may be provided at other position(s) within the stator 20. In another configuration, the AC winding 32 may include only one annular array having a plurality of AC bars.

Figure 2:
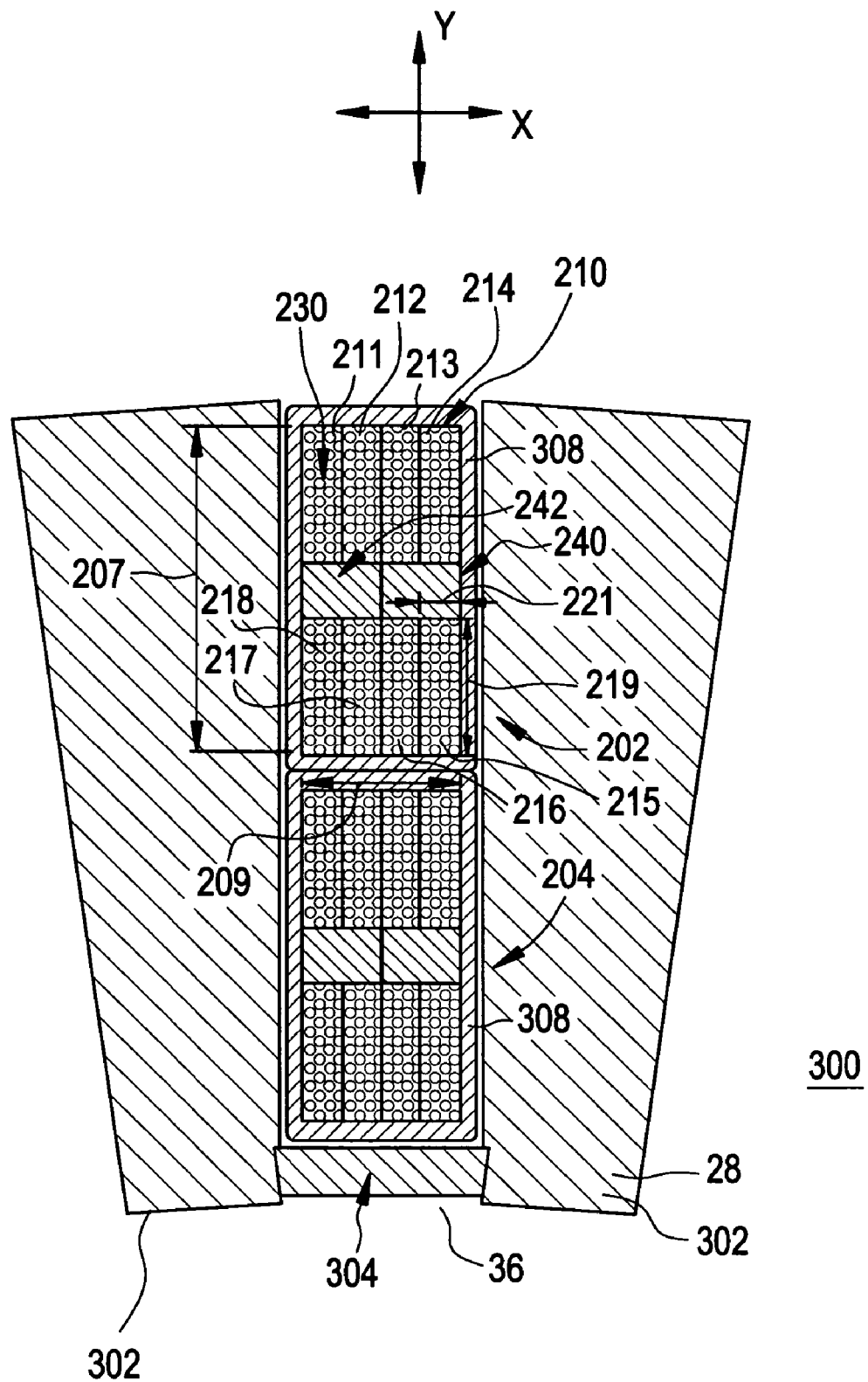
FIG. 2 is an enlarged view of a sector of the stator shown in the cross-sectional view of the stator in FIG. 1 showing armature bars.

With respect to FIG. 2, an exemplary sector 300 of a stator core 28 of the stator 20 is shown with a pair of outer and inner AC bars 202, 204, respectively. The pair of outer and inner AC bars 202, 204 are supported in a channel 36 defined by a pair of magnetic or nonmagnetic stator teeth 302 formed by the stator core 28, which is in particular embodiments electrically non-conducting and/or laminated to reduce losses. Each of the outer AC bar 202 and the inner AC bar 204 is provided with a formation of cooling tubes 240 having at least one cooling tube 242. A magnetic or non-magnetic wedge 304 is provided for closing the channel 36 at an interior end of the channel 36. Each AC bar 202, 204 is insulated by a relatively thick coating, phase to ground insulation 308 for providing phase to ground electrical insulation.

The configuration of AC bars 202 and 204 are substantially the same. The following description of outer AC bar 202 pertains to inner AC bar 204 as well. Each AC bar 202 in particular embodiments has a generally rectangular or trapezoidal shape, where the AC bar 202 has a pair of broad sides, the length of which is the height 207 of the AC bar 202, and a pair of short sides having the length of which is the width 209 of the AC bar 202, where the height 207 exceeds or does not exceed the width 209. Each AC bar 202 includes a coil 210 formed of litz wire wound into a single or a plurality of turns. In the exemplary embodiment shown, each outer AC bar 202 includes eight consecutive turns 211–218, however other amounts of turns may be used. In particular embodiments, the turns 211–218 are divided into first and second substantially symmetrical groups. In the example shown, a first group of turns includes turns 211–214 which is substantially symmetrical to a second group of turns 215–218. It is further envisioned that the outer AC bar 202 may include two or more groups of turns which are oriented vertically, as shown in FIG. 2, horizontally as shown below with respect to FIG. 3, or a combination thereof. The phase to ground insulation 308 surrounds the turns 211–218.

The plurality of outer AC bars 202 are connected into at least one series, via serial and/or parallel connections, including connecting the at least one series to terminals of the machine 10. Similarly, the plurality of inner AC bars 204 are connected into at least one series, via serial and/or parallel connections, including connecting the at least one series to terminals of the machine 10. It is contemplated that an individual series may include a combination of inner and/or outer AC bars 204, 202. Furthermore, the individual series may have multi-phases. In one embodiment of the present disclosure, as is known for armature windings, a series of outer windings runs through a first groove from a first end of the machine to a second end of the machine, and connects adjacent the second end of the machine with a series of inner windings running through a second groove from the second end of the machine to the first end of the machine.

The litz wire forming coil 210, as known in the art, includes a plurality of individual strands 230 including lightly insulated wires wound or twisted together in a pattern, in particular embodiments a uniform pattern. The strands are transposed in a specific configuration to reduce AC losses, as known in the art, The multi-strand configuration minimizes power losses otherwise encountered in a solid conductor due to what are commonly known as the "skin and proximity effects" and reduces high AC heating associated with eddy currents. Typically, as frequency requirements increase, the number of strands 230 is increased and the gauge size (or diameter) of the individual strands is decreased.

The cross-section of the respective turns 211–218 as shown is in particular embodiments shaped in a generally rectangular or trapezoidal configuration each rectangle having a pair of broad sides, the length of which is the height 219 of the turn, and a pair of short sides, the length of which is the width 221 of the turn, where the length 219 exceeds the width 221. The broad sides of the turns 211–218 may be positioned to be oriented either perpendicular or parallel to the orientation of the broad sides of the outer AC bar 202. In the exemplary configuration shown in FIG. 3, the broad sides of the turns 211–218 are oriented parallel to the broad sides of the outer AC bar 202.

The formation of cooling tubes 240 is positioned interior to the outer AC bar 202, e.g., within the space defined by the phase to ground insulation 308, and configured for maximizing a contact surface or heat transfer area between the at least one cooling tube 242 and the turns 211–218 for transferring heat from the turns 211–218 to the cooling tubes 242. The formation of cooling tubes 240 is positioned interior to the phase to ground insulation 308, so that heat transfer between the cooling tubes 240 and turns 211–218 does not have to traverse the phase to ground insulation 308.

The majority of the heat transfer from the turns 211–218 occurs by way of a flow of heat along the individual strands 230 in a longitudinal direction (e.g., along the longitudinal axis of the individual strands), and transfer of heat from the respective individual strands 230 to the formation of cooling tubes as described in further detail below with respect to FIG. 4.

In particular embodiments, the formation of cooling tubes 240 is arranged collectively in a generally rectangular or other suitable shape. The orientation of the turns 211–218 to the formation of cooling tubes 240 enables each turn of the coil 210 (and the number of turns may be high in some coils) to be positioned adjacent to or in particular embodiments in contact with the formation of cooling tubes along a path oriented along the z-axis (i.e., orthogonal to the paper), where a surface area of the turn and a surface area of the formation of cooling tubes 240 are positioned adjacent to or in contact with one another for establishing an area of heat exchange. The individual cooling tubes 242 may be placed end to end into a serial chain, in a parallel configuration, or a combination thereof for forming the formation of cooling tubes 240 for reducing the peak temperature and pumping power needed for pumping cooling medium through the cooling tubes 242. Heat exchange may further occur between the individual cooling tubes 242. The cooling tubes 242 are in particular embodiments made of a highly thermally conductive and highly electrically resistive non-magnetic, metallic material which is corrosion and erosion resistant, such as stainless steel.

In particular embodiments, the first group of turns 211–214 are arranged substantially symmetrically about the formation of cooling tubes 240 with relation to the second group of turns 215–218 for maximizing the number of turns arranged for heat exchange with the formation of cooling tubes 240 for maximizing the heat exchange capabilities. In particular embodiments, a maximum number of turns are arranged for heat exchange at opposing faces of the cooling tube formation 240. Furthermore, in particular embodiments, the turns are of uniform size and shape. The symmetrical contact relationship enables each turn of a coil 210, even when a large number of turns are included in the coil, to exchange heat with the formation of cooling tubes 240 in a compact and efficient manner.

The cooling tubes 242 have a floating voltage potential within the range of the coil's turn-to-turn voltage. In particular embodiments, the cooling tube formation 240 is electrically insulated with a film insulation of sufficient thickness to withstand a maximum voltage difference among the turns 211–218 contacting the formation of cooling tubes 240. In addition, in particular embodiments, the individual cooling tubes 242 are electrically insulated from each other, such as with an electrically insulating hose or connector, e.g., as the individual cooling tubes 242 are connected together to form the formation of cooling tubes 240. Furthermore, in particular embodiments, the cooling tubes 242 are coated, individually and/or collectively, with a thermally activated and/or thermally conductive adhesive for maximizing contact between the cooling tubes 242 and the turns 211–218 for maximizing the transfer of heat away from the turns 211–218. Furthermore, in another embodiment, the entire outer AC bar 202, or portions thereof, are treated by a vacuum pressure impregnation (VPI) process to remove voids and air and for providing additional mechanical support.

In particular embodiments, the cooling tubes 242 are included in a cooling system for causing a cooling medium, (e.g., a liquid, gas, cryogenic cooling fluid, etc.) to flow through the cooling tubes 242, including a pumping or suction device for causing flow of the cooling medium, conduits for the cooling medium, a supply of cooled cooling medium and/or a heat sink for cooling the cooling medium. Furthermore, in particular embodiments, walls of the cooling tubes 242, particularly walls that contact the turns 211–218, are thin for minimizing the occurrence of eddy currents.

Figure 3:
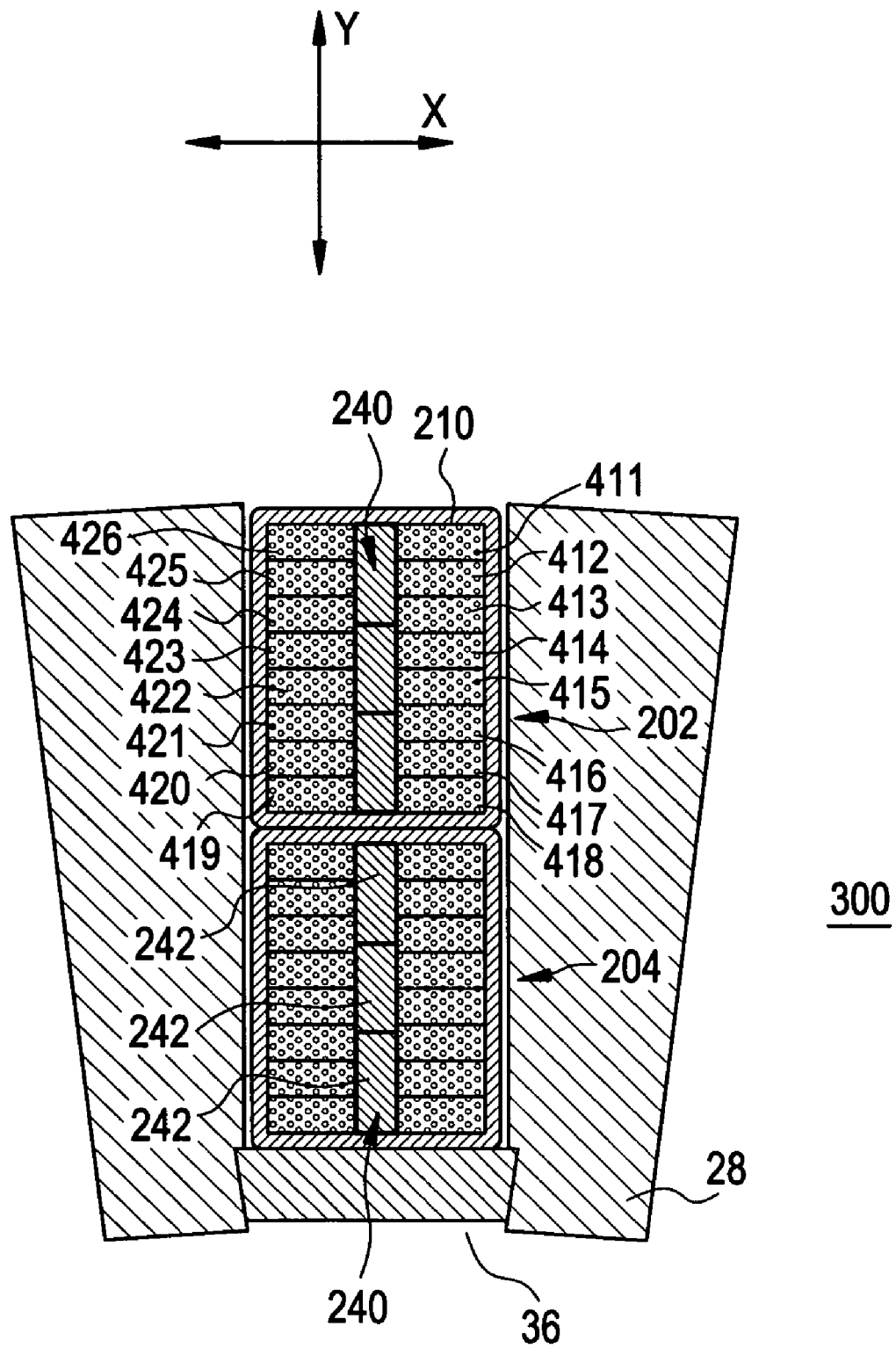
FIG. 3 is an enlarged view of a sector of the stator shown in the cross-sectional view of the stator in FIG. 1 showing another configuration of the armature bars.

With reference to FIG. 3, another configuration of the AC bars 202, 204 is shown, where the outer AC bar 202 includes a set of turns 411–426, where the broad sides of the turns 411–426 are perpendicular to the broad sides of the corresponding AC bar 202, 204, and the broad sides of the formation of cooling tubes 240 is parallel to the broad sides of the outer AC bar 202. The configuration of AC bars 202 and 204 are substantially the same. As shown, each turn 411–426 contacts or is adjacent to the formation of cooling tube 240, with the turns 411–426 arranged symmetrically about the formation of cooling tubes 240, and contacting or adjacent to opposing faces of the formation of cooling tubes 240.

The armature windings described above are particularly useful for high frequency electric machines, such as high speed and/or high power density electric machines, such as machines operating at frequencies significantly higher than 60 Hz, for example, motors or generators used in commercial or military applications, including applications requiring light weight and compact electric machines, such as aircraft applications.

Figure 4:
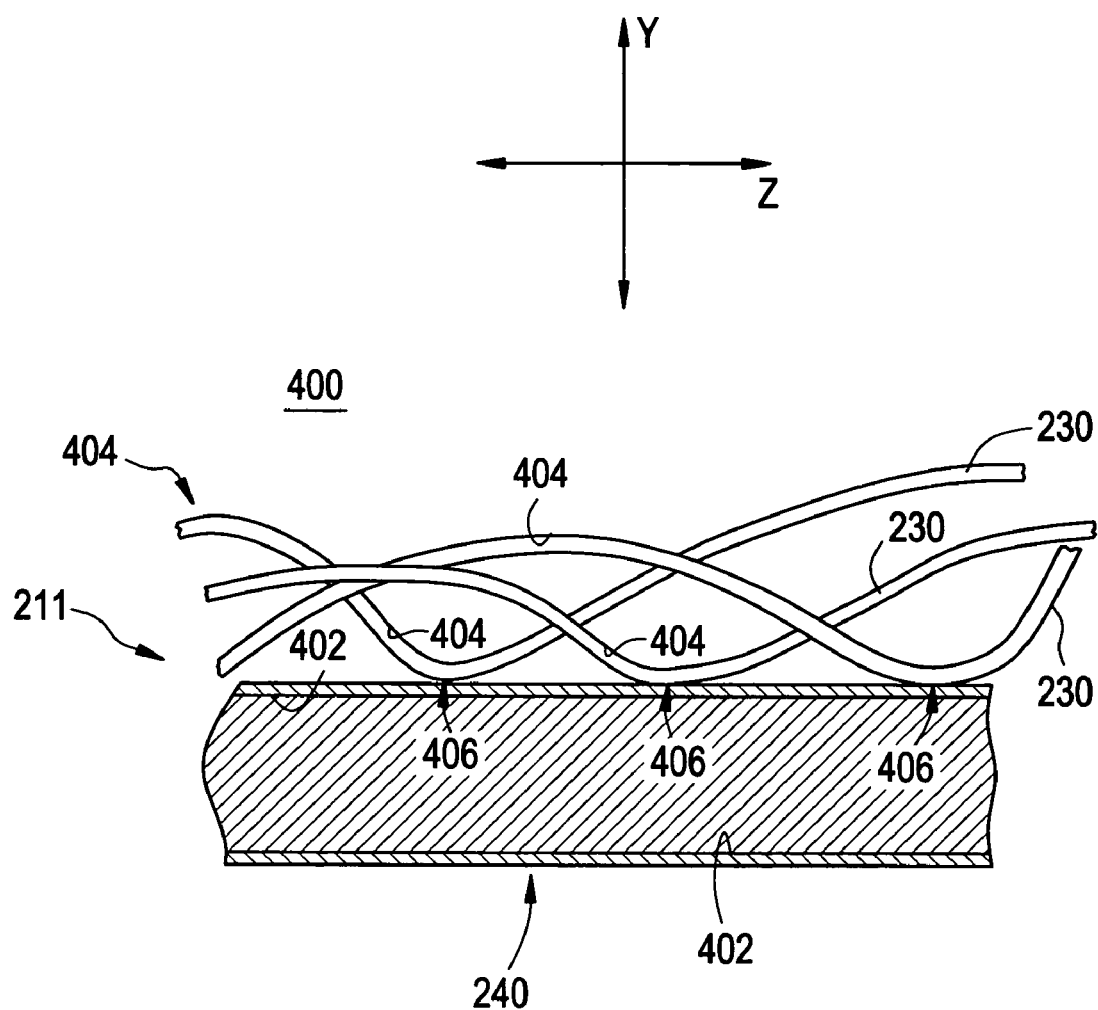
FIG. 4 is a partial cross-sectional view of a heat exchange area including respective portions of a turn and a formation of cooling bars of an individual armature bar shown in FIG. 2.

FIG. 4 shows an area of heat exchange including a portion of turn 211 and the formation of cooling bars 240 shown in a cross-section view, where in particular embodiments, the other turns 212–219 are substantially similar to turn 211. The formation of cooling tubes 240 is shown to have a first thin film insulation 402, where the first film insulation is configured to provide electrical insulation for the maximum voltage generated by the turn 211, and is considerably thinner than the thick phase to ground insulation 308.

Strands 230 of the litz wire of turn 211 are exposed, where in particular embodiments, the actual number of strands is greater than the number of strands 230 shown. Each strand 230 is insulated by a second thin film insulation 404, where the second film insulation 404 is configured to provide electrical insulation for the maximum strand to strand voltage, and is considerably thinner than the first film insulation 402. The second film insulation 404 may be formed, for example, of polyvinylformal and/or polyurethane materials having low electrical loss, however, other insulation materials may be used. In particular embodiments, the strands 230 are further coated with a thermally activated adhesive.

Furthermore, the litz wire may be insulated by a single or double wrap (not shown), where the wrap is configured to provide electrical insulation for the maximum turn to turn voltage, and which is considerably thinner than the thick phase to ground insulation 308. The wrap may be formed, for example, of a textile, such as nylon. It is contemplated that portions of the litz wire may be wrapped, while other portions are unwrapped, where sections of the litz wire that lie within the area of heat exchange, e.g., contact or are adjacent to the cooling tubes 242, are unwrapped. The combined thickness of the first film insulation 402, the second film insulation 404 and the wrap is considerably smaller than the thickness of the phase to ground insulation 308. Accordingly, the cooling effect provided by the formation of cooling tubes 240 is superior to a cooling effect from a similar cooling tube provided at the exterior of an AC bar, where the heat transfer must traverse a phase to ground insulation.

The strands 230 are twisted in a configuration so that the strands 230 rise and fall relative to the position of the formation of cooling tubes 240. In particular embodiments, each strand 230 is twisted so that it is positioned to contact the formation of cooling tubes 240 or to be adjacent the formation of cooling tubes 240 at at least one transfer point 406, where heat is exchanged from the strand 230 to the formation of cooling tubes 240. Accordingly, generated heat is efficiently dissipated by being transferred along the individual strands 230 in a longitudinal direction of the strand 230, and then being transferred to the formation of cooling bars 240 at each transfer point 406. The efficient transfer of heat described is superior to transfer of heat in a transverse direction, such as strand to strand, and/or transfer of heat across a thick electrical insulator.

As described above, the turn 211 contacts (or is adjacent to) the cooling tube at the portion of the turn 211 that extends along a path running parallel to the z-axis (i.e., out of the paper in FIG. 2), where in particular embodiments, the length is maximized for maximizing the number of transfer points. Similarly, for turn 411 of FIG. 3, the turn 411 contacts (or is adjacent to) the formation of cooling tubes 240 at the portion of the turn 411 that extends along a path running parallel to the z-axis (i.e., out of the paper in FIG. 3), where in particular embodiments the length is maximized for maximizing the number of transfer points. The portion of turn 211 shown in FIG. 4 is substantially the same as an analogous portion of turn 411, however the orientation would be rotated by 90 degrees, where the y-axis shown would be replaced by the x-axis.

The coil 210 is formed by winding the litz wire to create the turns, followed by thermally insulating the litz wire with a thermally activated adhesive, and forming the wound litz wire into the desired shape (in particular embodiments with the first group of turns and second group of turns substantially symmetrically configured), all at ambient temperature. Next, the shaped and insulated coil 210 is baked for curing the adhesives.

In another embodiment of the present disclosure, the coil 210 is formed by winding and shaping the coil 210 into its desired shape (in particular embodiments with the first group of turns and second group of turns substantially symmetrically configured) without applying the adhesives. Next, the coil 210 is epoxy impregnated. Furthermore, the coil 210 may be formed by using a combination of thermally activated adhesives and epoxy impregnation.

It is desirable to fill voids within the AC bars, including voids external to turns 211-211–218, and voids internal to the turns 211–218, such as between strands 230. To accomplish such elimination of voids, the strands 239 may be insulated with a film that liquefies and hardens during VPI processing, such as a B-stage epoxy. The litz wire may be wrapped in a resin that is activated to fill the voids upon VPI processing.

The described embodiments of the present disclosure are intended to be illustrative rather than restrictive, and are not intended to represent every embodiment of the present disclosure. Various modifications and variations can be made without departing from the spirit or scope of the present disclosure as set forth in the following claims both literally and in equivalents recognized in law.

What is claimed is:

1. A winding of an electric machine comprising:
at least one series of serially connected AC bars, each AC bar comprising:
a series of serially connected turns formed by litz wire having a plurality of strands; and
at least one cooling tube, wherein individual strands of the plurality of strands are respectively positioned substantially adjacent to the at least one cooling tube at at least one transfer point for providing heat transfer from the respective individual strands to the at least one cooling tube.

2. The winding of claim 1, wherein heat is further transferred along the respective individual strands along the direction of a longitudinal axis of the respective individual strands.

3. The winding of claim 1, wherein a surface area of individual turns of the series of turns is positioned substantially adjacent to a respective surface area of the at least one cooling tube for establishing respective heat transfer areas, wherein each respective heat transfer area includes a plurality of transfer points.

4. The winding of claim 3, wherein each turn is positioned for establishing a respective heat transfer area.

5. The winding of claim 1, wherein the at least one cooling tube is formed of stainless steel.

6. The winding of claim 1, wherein the series of turns includes a first and second group of turns, wherein the first group of turns is substantially symmetrically arranged with respect to the second group of turns.

7. The winding of claim 6, wherein the first and second groups of turns are symmetrically arranged around the at least one cooling tube.

8. The winding of claim 3, wherein the at least one cooling tube has first and second opposing surfaces, and wherein heat transfer areas are established along the first and second opposing surfaces.

9. The winding of claim 1, wherein the series of turns is insulated with a thermally activated adhesive.

10. The winding of claim 1, wherein the series of turns is formed by winding the litz wire into a coil including the series of turns, insulating the coil with a thermally activated adhesive, shaping the coil into a predetermined shape, all at ambient temperature, and then heating the coil for curing the adhesive.

11. The winding of claim 1, wherein the series of turns is formed by winding the litz wire into a coil including the series of turns, shaping the coil into a predetermined shape, and epoxy impregnating the coil.

12. An electric machine having an AC winding comprising:
at least one series of serially connected AC bars, each AC bar comprising:
a series of serially connected turns formed by litz wire having a plurality of strands; and
at least one cooling tube, wherein individual strands of the plurality of strands are respectively positioned substantially adjacent to the at least one cooling tube at at least one transfer point for providing heat transfer from the respective individual strands to the at least one cooling tube.

13. A winding of an electric machine comprising:
at least one series of serially connected AC bars, each AC bar comprising:
a series of serially connected turns including at least one conductor;
at least one cooling tube having a cooling medium flowing through a conduit having a thermally conductive surface; and
a phase to ground insulation for providing electrical phase to ground insulation for the AC bar, wherein the phase to ground insulation surrounds the series of serially connected turns and the at least one cooling tube;
wherein respective turns of the series of turns contact the at least one cooling tube for transferring heat from the respective turns to the at least one cooling tube, wherein at each point of contact the phase to ground insulation does not intervene between the conductive surface of the at least one cooling tube and a respective conductor of the at least one conductor.

14. The winding of claim 13, wherein the at least one cooling tube has a floating voltage potential.

15. The winding of claim 14, wherein the floating voltage potential is within the range of a turn-to-turn voltage of the series of turns.

16. The winding of claim 13, wherein the at least one cooling tube is electrically insulated with a film insulation of thickness not substantially greater than a minimum thickness for withstanding a maximum voltage difference between turns of the series of turns that contact the at least one cooling tube.

17. The winding of claim 13, wherein the at least one cooling tube is coated with a thermally activated adhesive.

18. The winding of claim 13, wherein at each point of contact a maximum amount of insulation intervening between the conductive surface and the at least one conductor includes at least one film insulator having a collective thickness substantially smaller than a thickness of the phase to ground insulation.

19. The winding of claim 13, wherein each turn included in the AC bar contacts the at least one cooling tube for transferring heat from the respective turn to the at least one cooling tube.

20. The winding of claim 13, wherein the at least one cooling tube has first and second opposing surfaces, and wherein turns of the series of turns contact the at least one cooling tube along the first and second opposing surfaces.

* * * * *